(12) United States Patent
Falls et al.

(10) Patent No.: US 11,311,994 B2
(45) Date of Patent: Apr. 26, 2022

(54) TOOL FOR REMOVAL OF SPRING CLIP FROM A NUT PLATE ASSEMBLY AND ASSOCIATED METHOD

(71) Applicant: THE BOEING COMPANY, Chicago, IL (US)

(72) Inventors: Steven B. Falls, Graham, WA (US); Scott K. Frankenbery, Tacoma, WA (US); Joshua R. Murphy, Fircrest, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/114,290

(22) Filed: Dec. 7, 2020

(65) Prior Publication Data

US 2021/0154815 A1    May 27, 2021

Related U.S. Application Data

(62) Division of application No. 16/013,102, filed on Jun. 20, 2018, now Pat. No. 10,857,657.

(51) Int. Cl.
*B25B 27/30* (2006.01)
*F16B 37/04* (2006.01)

(52) U.S. Cl.
CPC ........ *B25B 27/308* (2013.01); *B23P 2700/01* (2013.01); *F16B 37/041* (2013.01)

(58) Field of Classification Search
CPC ......... B25B 27/308; F16B 37/041; B64F 5/40
See application file for complete search history.

(56) References Cited

U.S. PATENT DOCUMENTS 7,191,687 B1   3/2007   Wadsley
8,276,252 B2   10/2012  Liu

*Primary Examiner* — Nirvana Deonauth
(74) *Attorney, Agent, or Firm* — Womble Bond Dickinson (US) LLP

(57) ABSTRACT

A tool for removal of a spring clip from a nut plate assembly includes an inner sleeve having a first cleat configured to engage a first end of a spring clip and an outer sleeve having a second cleat configured to engage a second end of the spring clip, the outer sleeve being rotatably disposed around a portion of the inner sleeve. The tool includes first and second grip tabs respectively extending radially from a longitudinally extending central axis of the inner sleeve and the outer sleeve. Movement of the first grip tab and the second grip tab towards each other rotates the inner sleeve relative to the outer sleeve, and causes the first cleat and the second cleat to rotate towards each other to engage the first and second ends of the spring clip and to enable the spring clip to be removed from an assembled nut plate.

8 Claims, 14 Drawing Sheets

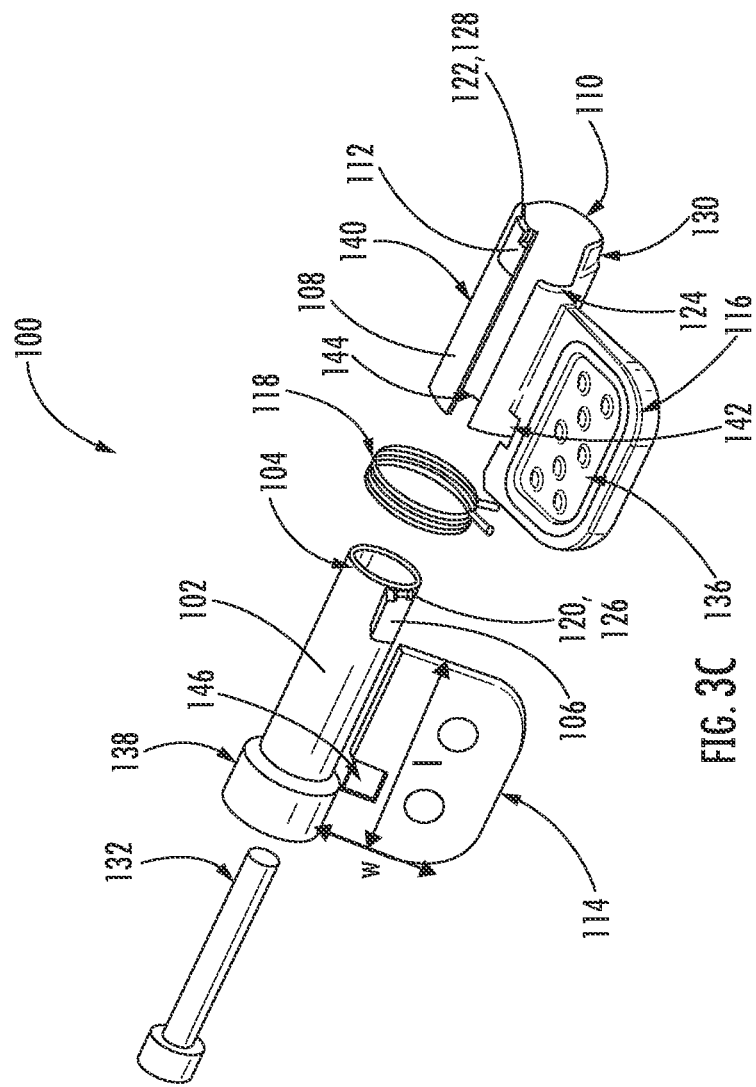
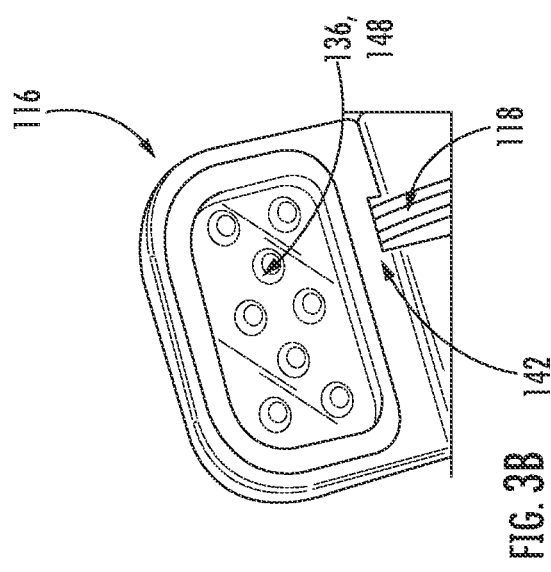

TOOL FOR REMOVAL OF SPRING CLIP FROM A NUT PLATE ASSEMBLY AND ASSOCIATED METHOD

CROSS REFERENCE TO RELATED APPLICATION

This application is a divisional of U.S. application Ser. No. 16/013,102, filed on Jun. 20, 2018, which application is hereby incorporated in its entirety by reference in this application.

BACKGROUND

Field of the Disclosure

The present disclosure relates generally to a tool used to interact with a nut plate assembly, and more particularly, to a tool for removal and/or reinstallation of a spring clip and/or a barrel nut from a nut plate assembly during manufacture and/or maintenance of a structure to which a nut plate is secured.

Description of Related Art

In the field of aircraft manufacture, many nut plate assemblies are typically employed throughout the aircraft. Nut plate assemblies conventionally include a nut plate, an internally threaded barrel nut, and a retaining spring for selectively securing the internally threaded barrel nut to the nut plate. The nut plate assemblies are usually mounted to support structures, which are surrounded by other support structures thus making access to the nut plate assemblies difficult.

Despite their widespread use in aircraft manufacture, however, currently no dedicated tools exist for servicing conventional nut plate assemblies. This tends to be problematic as during manufacture and/or maintenance of a structure to which the nut plate assemblies are affixed, such as an aircraft, it is desirable to remove the internally threaded barrel nut from the nut plate. To do so, technicians typically use rigid tools, such as needle nose pliers, picks, awls, etc., to collapse the retaining spring in the nut plate in order to release the internally threaded barrel nut from the nut plate. Yet, once released, the internally threaded barrel nuts and/or the retaining springs tend to fall, creating foreign object debris (FOD) within the aircraft. Additionally, the rigid tools often leave marks on the nut plate assembly base, which result in repair or even complete removal and replacement, thereby adding excessive time to repair.

SUMMARY

Example aspects of the present disclosure are directed to dedicated tools for removal of a spring clip from a nut plate assembly and methods for removal of a spring clip from a nut place assembly in order to avoid foreign object debris (FOD). Example aspects provide a simplified and efficient approach to removing a spring clip from a nut plate assembly during manufacture and/or maintenance of a structure to which a nut plate is secured.

Example aspects provide a tool for removal of a spring clip from a nut plate assembly, the tool including: an inner sleeve having an end with a first cleat configured to engage an outer surface of a first end of a spring clip; an outer sleeve having an end with a second cleat configured to engage an outer surface of a second end of the spring clip, the outer sleeve being rotatably disposed around a portion of the inner sleeve; and a first grip tab and a second grip tab respectively extending radially from a longitudinally extending central axis of the inner sleeve and the outer sleeve; wherein movement of the first grip tab and the second grip tab towards each other rotates the inner sleeve relative to the outer sleeve, and causes the first cleat and the second cleat to rotate towards each other to engage the outer surfaces of the first and second ends of the spring clip and to enable the spring clip to be removed from an assembled nut plate.

In some example aspects of the tool of the preceding aspect, or a combination of any of the preceding aspects, the tool further includes a torsion member operably engaged between the inner and outer sleeves and configured to normally bias the first cleat and the second cleat apart from each other.

In some example aspects of the tool of the preceding aspects, or a combination of any of the preceding aspects, the first and second cleats of the tool further include opposing lugs extending axially from the first and second cleats on the inner sleeve and the outer sleeve, respectively, and configured to respectively engage the outer surfaces of the first and second ends of the spring clip for compressing the spring clip when the first and second cleats are rotated toward each other.

In some example aspects of the tool of the preceding aspects, or a combination of any of the preceding aspects, the outer sleeve of the tool further includes a stop element configured to engage the first cleat of the inner sleeve so as to limit an extent that the first cleat and second cleat rotate away from each other such that the opposing lugs of the first and second cleats when farthest apart from each other are configured to fit between respective side walls of the nut plate assembly and engage the outer surfaces of the first and second ends of the spring clip.

In some example aspects of the tool of the preceding aspects, or a combination of any of the preceding aspects, the opposing lugs of the tool further include clip-engaging surfaces angled toward each other at a draft angle so as to converge toward each other axially away from the respective cleats, the draft angle of each of the clip-engaging surfaces being between about −2 degrees and about −10 degrees, and wherein the angled clip-engaging surfaces are configured to cooperate to retain the first and second ends of the spring clip when the spring clip is compressed.

In some example aspects of the tool of the preceding aspects, or a combination of any of the preceding aspects, the opposing lugs of the tool each extend at least a predetermined length from the first and second cleats, the predetermined length being at least a thickness of the spring clip.

In some example aspects of the tool of the preceding aspects, or a combination of any of the preceding aspects, the tool further includes a channel disposed at the end of the inner sleeve, which provides clearance relative to the spring clip when the first end and the second end of the spring clip are compressed by the opposing lugs.

In some example aspects of the tool of the preceding aspects, or a combination of any of the preceding aspects, the tool further includes a threaded bolt configured to be received in and engaged with an internally threaded hole extending along the longitudinally extending central axis of the inner sleeve, the threaded bolt being disposed within an internally threaded hole of the internally threaded nut but not contacting an internally threaded nut retained by the spring clip within the nut plate assembly, wherein compression of the spring clip is configured to cause the internally threaded nut to move off-center and into contact with the an inner side wall of the inner sleeve and into contact with the threaded bolt so as to hold the internally threaded nut with respect to the threaded bolt and inner side wall the inner sleeve such that the spring clip and the internally threaded nut are retained and removed together from the nut plate assembly.

In some example aspects of the tool of the preceding aspects, or a combination of any of the preceding aspects, the first grip tab and the second grip tab of the tool each have a length relative to and along the longitudinally extending central axis of at least about 0.5 inches and a width defined as a radial distance from an exterior surface of the outer sleeve or the inner sleeve of at least about 0.5 inches.

In some example aspects of the tool of the preceding aspects, or a combination of any of the preceding aspects, the length of the first grip tab and the second grip tab of the tool is between about 0.5 inches and about 1.0 inches and the width is between about 0.5 inches and about 0.75 inches.

In some example aspects of the tool of the preceding aspects, or a combination of any of the preceding aspects, the first grip tab and the second grip tab of the tool each define a gripping surface, the gripping surface having an insert, a coating, or a texture engaged therewith for facilitating a secure grip.

In some example aspects of the tool of the preceding aspects, or a combination of any of the preceding aspects, the outer sleeve of the tool further includes a stop element configured to interact with the inner sleeve so as to limit rotation of the first and second grip tabs away from each other.

Example aspects also provide a method for removal of a spring clip from a nut plate assembly, the method including rotatably disposing an outer sleeve having a first grip tab around a portion of an inner sleeve having a second grip tab, the first grip tab and the second grip tab respectively extending radially from a longitudinally extending central axis of the inner sleeve and the outer sleeve and the first and second grip tabs being normally biased away from each other; engaging an outer surface of a first end of a spring clip using a first cleat disposed at an end of the inner sleeve and engaging an outer surface of a second end of the spring clip using a second cleat disposed at an end of the outer sleeve; and moving the first grip tab and the second grip tab towards each to rotate the inner sleeve relative to the outer sleeve so as to cause the first cleat and the second cleat to rotate towards each other to engage the outer surfaces of the first and second ends of the spring clip and urge the first and second ends together to enable the spring clip to be removed from an assembled nut plate.

In some example aspects of the method of the preceding aspects, or a combination of any of the preceding aspects, rotatably disposing an outer sleeve around the portion of the inner sleeve further comprises operably engaging a torsion member between the inner and outer sleeves so as to normally bias the first cleat and the second cleat apart from each other.

In some example aspects of the method of the preceding aspects, or a combination of any of the preceding aspects, engaging the outer surfaces of the first and second ends of the spring clip further comprises compressing the spring clip when the first and second cleats are rotated toward each other using opposing lugs extending axially from the first and second cleats on the inner sleeve and the outer sleeve, respectively.

In some example aspects of the method of the preceding aspects, or a combination of any of the preceding aspects, rotatably disposing the outer sleeve around the portion of the inner sleeve further comprises interacting a stop element of the outer sleeve with the inner sleeve so as to limit an extent that the first cleat and second cleat rotate away from each other, such that the opposing lugs of the first and second cleats when farthest apart from each other fit between respective side walls of the nut plate assembly and engage the outer surfaces of the first and second ends of the spring clip.

In some example aspects of the method of the preceding aspects, or a combination of any of the preceding aspects, engaging the outer surfaces of the first and second ends of the spring clip using the opposing lugs further comprises cooperatively retaining the first and second ends of the compressed spring clip with clip-engaging surfaces angled toward each other at a draft angle, the clip-engaging surfaces being disposed on the opposing lugs and converging toward each other axially away from the respective cleats, the draft angle of each of the clip-engaging surfaces being between about −2 degrees and about −10 degrees.

In some example aspects of the method of the preceding aspects, or a combination of any of the preceding aspects, engaging the outer surfaces of the first and second ends of the spring clip using the opposing lugs further comprises engaging the outer surfaces of the first and second ends of the spring clip using the opposing lugs each extending at least a predetermined length from the first and second cleats, the predetermined length being at least a thickness of the spring clip.

In some example aspects of the method of the preceding aspects, or a combination of any of the preceding aspects, moving the first grip tab and the second grip tab towards each to rotate the inner sleeve relative to the outer sleeve causes compression of the spring clip circumferentially with clearance provided by a channel disposed at the end of the inner sleeve when the first end and the second end of the spring clip are compressed by the opposing lugs.

In some example aspects of the method of the preceding aspects, or a combination of any of the preceding aspects, the method further includes engaging a threaded bolt with an internally threaded hole extending along the longitudinally extending central axis of the inner sleeve with respect to the internally threaded hole, the threaded bolt being disposed within but not in contact with an internally threaded nut retained by the spring clip within the nut plate assembly, such that compressing the spring clip causes the internally threaded nut to move off-center and into contact with an inner side wall of the inner sleeve and also the threaded bolt so as to hold the internally threaded nut with respect to the threaded bolt and the inner side wall of the inner sleeve such that the spring clip and the internally threaded nut are retained and removed together from the nut plate assembly.

The features, functions and advantages discussed herein may be achieved independently in various example implementations or aspects or may be combined in yet other example implementations or aspects, further details of which may be seen with reference to the following description and drawings.

BRIEF DESCRIPTION OF THE DRAWING(S)

Having thus described example aspects of the disclosure in general terms, reference will now be made to the accompanying drawings, which are not necessarily drawn to scale, and wherein:

FIG. 3B illustrates a detailed view of a second grip tab with a rubber insert having a pattern of raised protrusions engaged therewith according to example aspects of the present disclosure;

FIG. 3C illustrates an exploded view of an alternate embodiment of a tool for removal of a spring clip from a nut plate assembly according to example aspects of the present disclosure;

DETAILED DESCRIPTION

Figure 1:
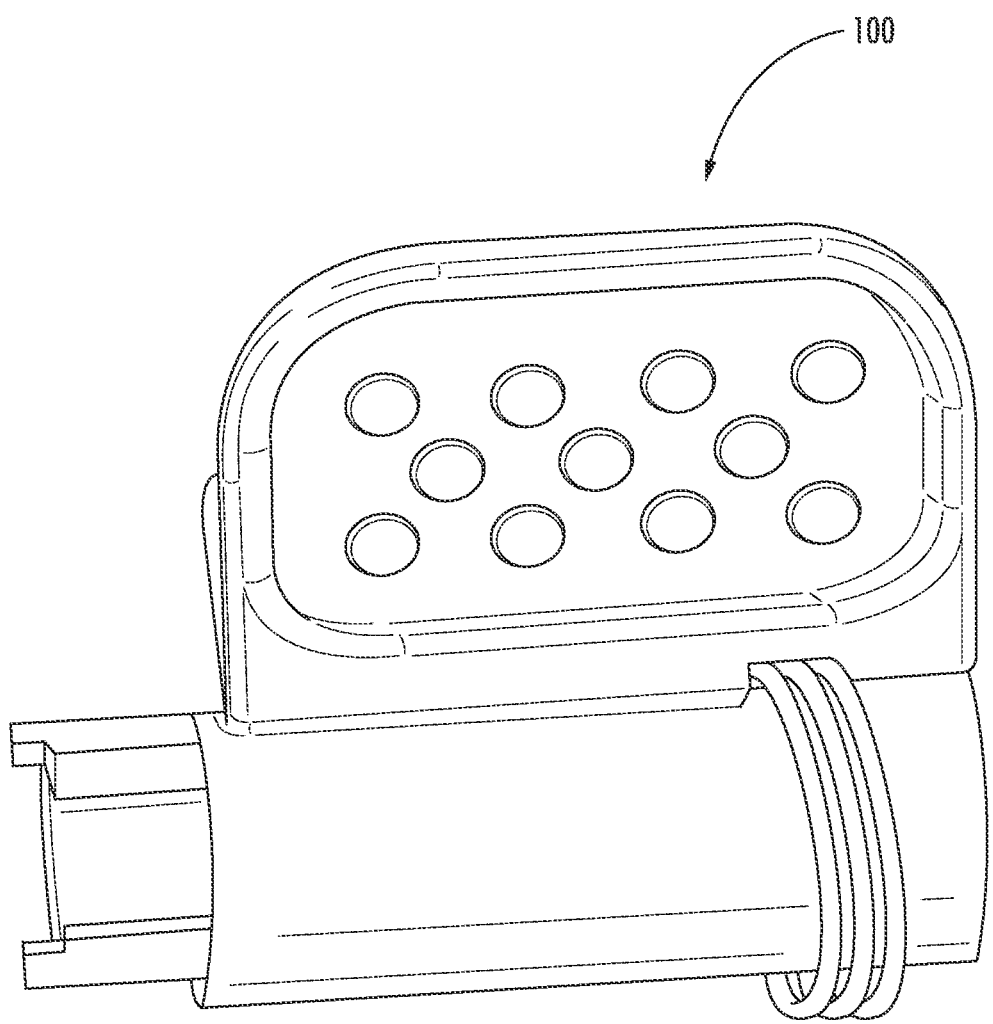
FIG. 1 illustrates an assembled tool for removal of a spring clip from a nut plate assembly according to example aspects of the present disclosure.

Some aspects of the present disclosure will now be described more fully hereinafter with reference to the accompanying drawings, in which some, but not all aspects of the disclosure are shown. Indeed, various aspects of the disclosure may be expressed in many different forms and should not be construed as limited to the aspects set forth herein; rather, these exemplary aspects are provided so that this disclosure will be thorough and complete, and will fully convey the scope of the disclosure to those skilled in the art. As used herein, the term "and/or" and the "/" symbol includes any and all combinations of one or more of the associated listed items.

Further, unless otherwise indicated, something being described as being a first, second or the like should not be construed to imply a particular order. It should be understood that the terms first, second, etc. may be used herein to describe various steps, calculations, positions and/or the like, these steps, calculations or positions should not be limited to these terms. These terms are only used to distinguish one operation, calculation, or position from another. For example, a first position may be termed a second position, and, similarly, a second step may be termed a first step, without departing from the scope of this disclosure. Additionally, something may be described as being above something else (unless otherwise indicated) may instead be below, and vice versa; and similarly, something described as being to the left of something else may instead be to the right, and vice versa. As used in the specification, and in the appended claims, the singular forms "a", "an", "the", include plural referents unless the context clearly dictates otherwise. Like reference numerals refer to like elements throughout.

Aspects of the present disclosure provide for a tool and an associated method for removal of a spring clip from a nut plate assembly. Notably, although the tool described herein is described only in reference to a nut plate assembly, it is understood that the tool described herein is also, for example, utilized in reference to other similar fastening mechanisms. Further, as described herein, removal of the spring clip also constitutes, for example, removal of an internally threaded nut from the nut plate assembly, or merely constitutes removal of just the spring clip.

Figure 2A:
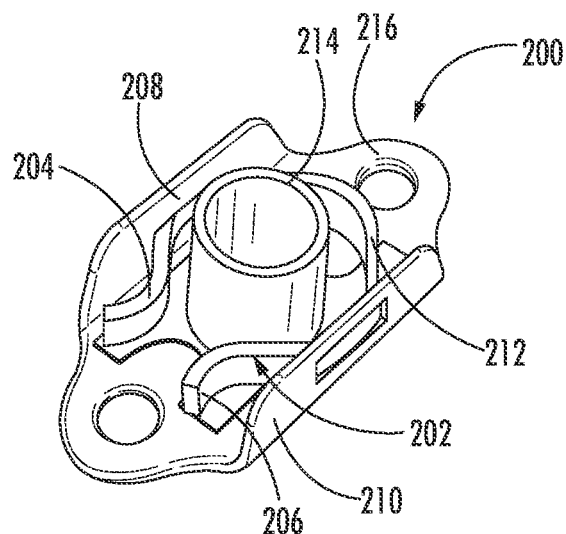
FIG. 2A illustrates an assembled nut plate assembly according to example aspects of the present disclosure.
Figure 2B:
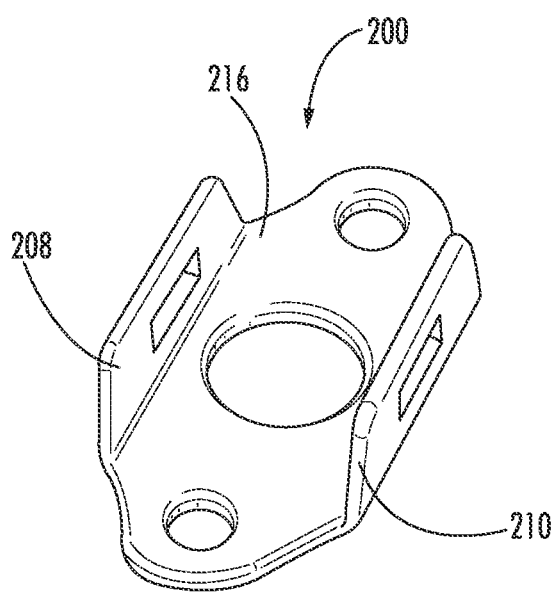
FIG. 2B illustrates the nut plate assembly of FIG. 2A with a spring clip and an internally threaded nut removed from a nut plate.

In one example aspect, FIG. 1 illustrates an assembled tool 100 for removal of a spring clip and/or an internally threaded nut from a nut plate assembly 200 (FIGS. 2A and 2B). FIGS. 2A and 2B illustrate example aspects of a nut plate assembly 200. The nut plate assembly as described herein is used, for example, in a structure where movement between two elements being secured is expected, such as wing-body fairing joints of an aircraft. However, the nut plate assembly is also utilized in applications other than aircraft, such as, for example, spacecraft, watercraft, vehicles, bridges, commercial, residential, or industrial building structures and the like. As such, the tool described herein is able to be utilized in any of these applications to provide a simplified and efficient approach to removing a spring clip and/or a barrel nut from a nut plate assembly during manufacture and/or maintenance of a structure to which a nut plate is secured.

Figure 6A:
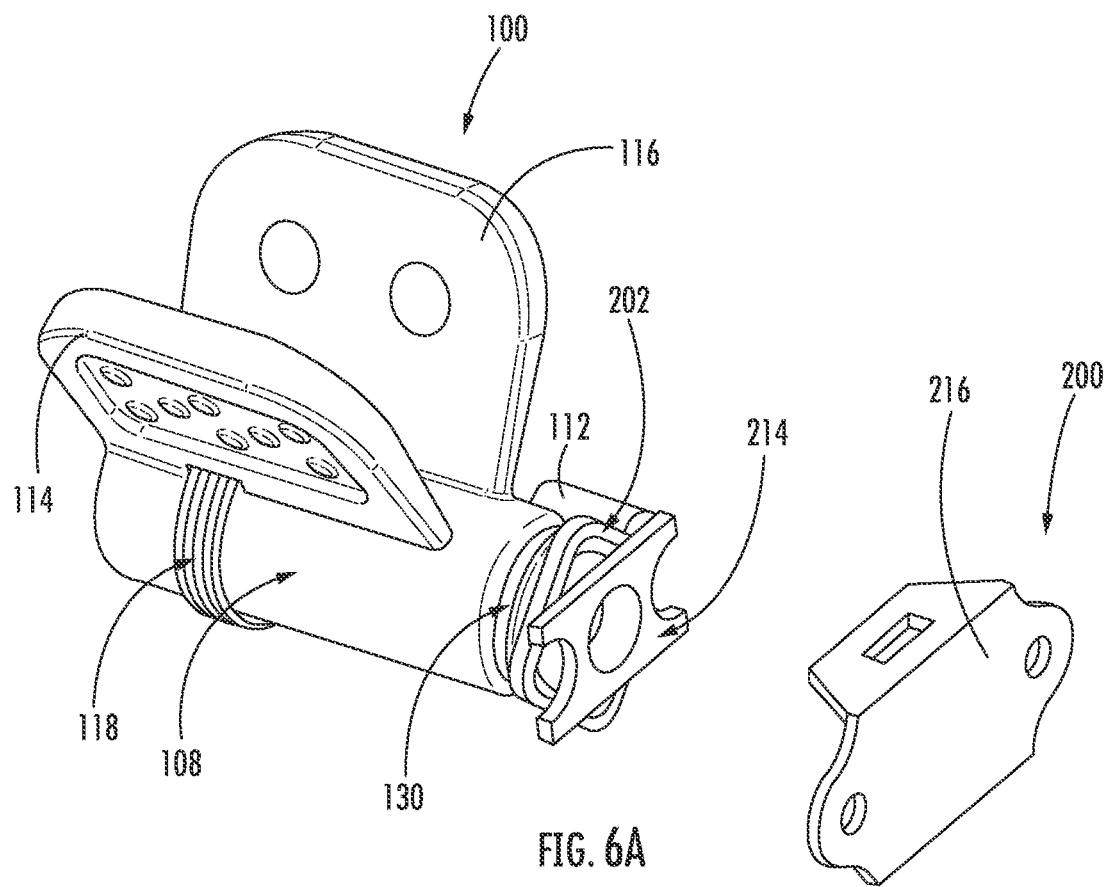
FIG. 6A illustrates the tool of FIG. 4A removing the spring clip and the internally threaded nut from a nut plate of the nut plate assembly.

Further, the nut plate assembly 200 as used herein is also referred to as a "floating nut plate assembly," "an assembled nut plate," "an assembly," and the like to refer to a mechanism including a spring clip or retaining spring 202 having a spring body 212 terminating in a first end 204 and a second end 206. In some examples, an internally threaded nut or barrel nut 214 is configured to be retained on a nut plate 216 of the assembly. For example, the internally threaded nut comprises a centrally defined and internally threaded opening that extends orthogonal to a laterally-extending surface thereof. The laterally-extending surface of the internally threaded nut is aligned with the nut plate, such that the laterally-extending surface of the internally threaded nut is configured to extend along a corresponding laterally-extending surface of the nut plate. In some examples, respective side walls 208, 210 of the nut plate extend orthogonal to the laterally-extending surface of the nut plate, the respective side walls including openings to receive portions of the spring clip. In some example aspects, the nut plate comprises a centrally defined opening, such that when the internally threaded nut is aligned with the nut plate, the centrally defined opening in the nut plate is axially aligned with the centrally defined and internally threaded opening of the internally threaded nut. FIG. 2B illustrates a nut plate having a centrally defined opening. In other example aspects, the nut plate does not comprise a centrally defined opening, such as shown in FIG. 6A which illustrates a nut plate without a centrally defined opening.

In order to securely retain the internally threaded nut 214 on the nut plate 216, while still allowing some lateral movement thereof, the spring body 212 of the spring clip 202 in some aspects is configured to substantially surround the centrally defined and internally threaded opening of the internally threaded nut, while portion(s) of the body of the spring clip are configured to fit within openings in the respective side walls 208, 210 of the nut plate. For example, in one aspect, the body of the spring clip is square shaped in a plan view such that two opposing corners of the spring clip are retained within the openings defined in the respective side walls. The body of the spring clip then terminates at the first end 204 and the second end 206 such that outer surfaces of the first end and the second end of the spring clip are disposed adjacent to the respective side walls. In this manner, compressing the first and second ends of the spring clip results in withdrawing the opposing corners of the body of the spring clip from the openings in the respective side walls and, thus, enables removal of the internally threaded nut from the nut plate along the axis defined by the threaded opening. FIG. 2B illustrates the nut plate 216 of the nut plate assembly 200 of FIG. 2A with the spring clip 202 and the internally threaded nut 214 removed therefrom.

Figure 3A:
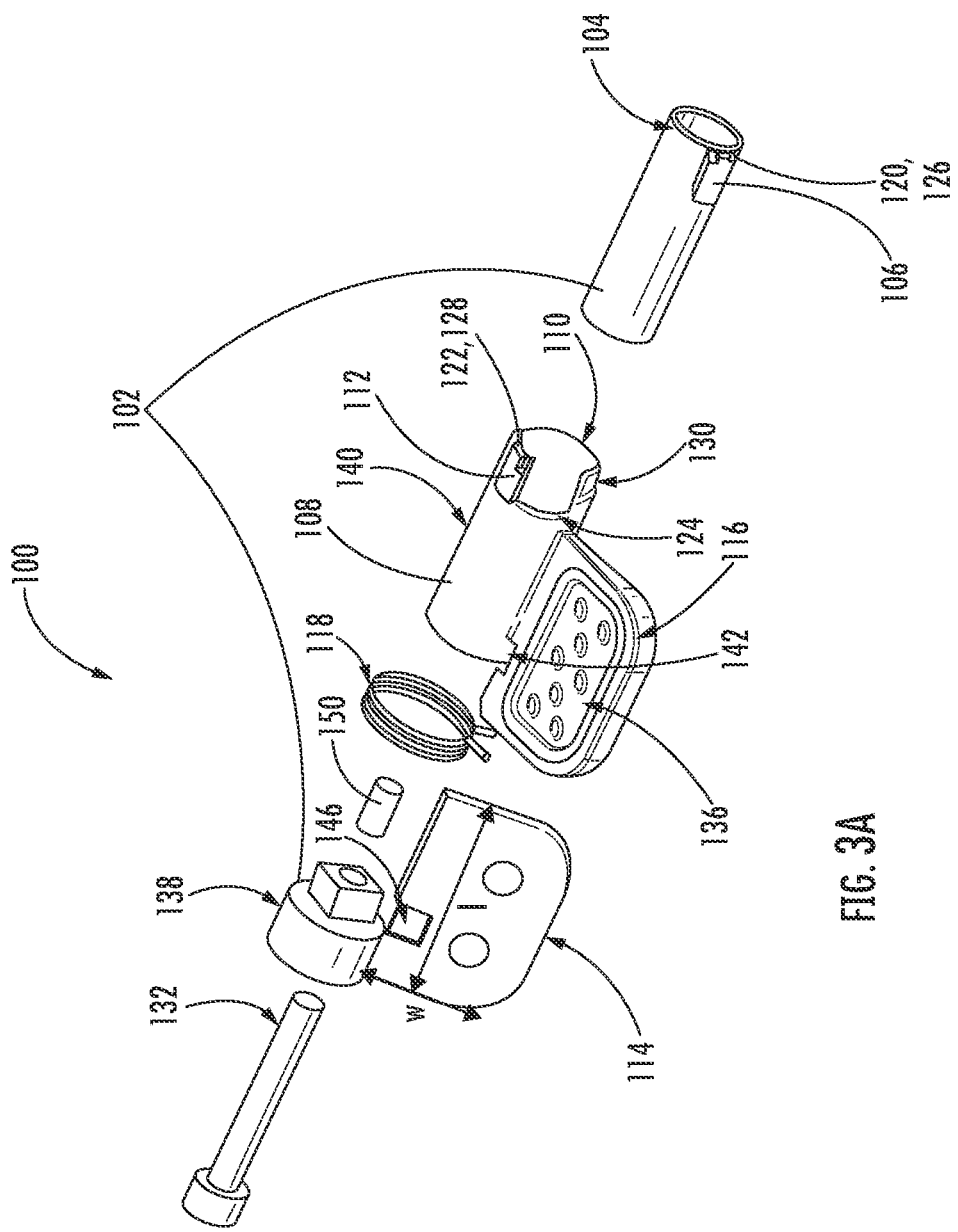
FIG. 3A illustrates an exploded view of a tool for removal of a spring clip from a nut plate assembly according to example aspects of the present disclosure.

Referring now to FIG. 3A, an example aspect of a tool 100 for removal of a spring clip and/or an internally threaded nut from a nut plate of a nut plate assembly is illustrated. The nut plate assembly is described, for example, in reference to FIGS. 2A and 2B or comprises a slightly different fastening mechanism. The tool 100 comprises an inner sleeve 102 having an end 104 with a first cleat 106 configured to engage an outer surface of a first end of a spring clip, such as a first end 204 of a spring clip 202, e.g., FIG. 2A. The tool also comprises an outer sleeve 108 having an end 110 with a second cleat 112 configured to engage an outer surface of a second end of the spring clip, such as a second end 206 of the spring clip, e.g., FIG. 2A.

In some example aspects, the inner sleeve 102 is sized so that the outer sleeve 108 is configured to receive at least a portion of the inner sleeve. For example, the inner sleeve is formed as an elongated cylinder having an outer diameter that is smaller than an inner diameter of the outer sleeve also formed as an elongated cylinder. In this manner, the outer sleeve is configured to be rotatably disposed around a portion of the inner sleeve such that the inner sleeve and the outer sleeve are axially aligned about a longitudinally extending central axis relative to one another. The inner sleeve 102 comprises a first portion 102A with a first grip tab 114, and a second portion 102B with a square protrusion that is coupled with and keyed to the first portion 102A, where the first portion 102A and second portion 102B are inserted within opposing ends of the outer sleeve 108 and secured to each other by threaded bolt 132. In another example alternate embodiment shown in FIG. 3C, the outer sleeve comprises a longitudinally extending opening 144, which enables the end 104 with the first cleat 106 of the inner sleeve to align therewith and slide through. In this way, the first cleat of the inner sleeve and the second cleat 112 of the outer sleeve are positioned adjacent to one another.

The tool 100 also comprises a first grip tab 114 and a second grip tab 116 that respectively extend radially from the longitudinally extending central axis of the inner sleeve 102 and the outer sleeve 108. In some examples, the first grip tab and the second grip tab each have a length l relative to and along the longitudinally extending central axis of at least about 0.5 inches and a width w defined as a radial distance from an exterior surface of the outer sleeve or the inner sleeve of at least about 0.5 inches. For example, the length of the first grip tab and the second grip tab is between about 0.5 inches and about 1.0 inches, and the width is between about 0.5 inches and about 0.75 inches. Such a length to width ratio (e.g., greater than 1:1, such as 3:1) increases the mechanical advantage of the tool for torque amplification.

In some example aspects, the first grip tab 114 and the second grip tab 116 are integrally formed with at least a portion of the respective inner and outer sleeves 102, 108. For example, and as illustrated in FIG. 3A, the first grip tab is formed integrally with a annular ring 138 formed about an exterior surface of the inner sleeve, while the second grip tab is formed integrally with a central portion 140 of an exterior surface of the outer sleeve. Otherwise, in some examples, the first and second grip tabs are removably attached to the respective inner and outer sleeves. In this manner, movement of the first grip tab 114 and the second grip tab 116 towards each other rotates the inner sleeve 102 relative to the outer sleeve 108, and causes the first cleat 106 and the second cleat 112 to rotate towards each other to engage the outer surfaces of the first and second ends of the spring clip to enable the spring clip to be removed from a nut plate.

In some example aspects, it is beneficial to provide a gripping surface 136 on each of the first grip tab 114 and the second grip tab 116. As such, the first grip tab and the second grip tab each define a gripping surface having an insert, a coating, and/or a texture engaged therewith for facilitating a secure grip. For example, the coating comprises a rubber or polymer insert or coating or comprises a metal grip having a pattern of raised protrusions provided thereon. FIG. 3B illustrates a rubber insert 148 having a pattern of raised protrusions provided therein.

In some example aspects, the first and second cleats 106, 112 further comprise opposing lugs 120, 122 extending axially from the first and second cleats on the inner sleeve 102 and the outer sleeve 108, respectively. For example, the opposing lugs each extend at least a predetermined axial length from the first and second cleats, the predetermined length being at least a thickness of the spring clip. The size of the tool, and thus, the axial length of the opposing lugs may vary depending on the size of the nut plate assembly(s) that the tool is able to accommodate. However, the tool may be configured to accommodate nut plate assemblies of various sizes. The opposing lugs are configured to respectively engage the outer surfaces of the first and second ends of the spring clip for compressing the spring clip when the first and second cleats are rotated toward each other. In some further example aspects, the opposing lugs further comprise clip-engaging surfaces 126, 128 angled toward each other at a draft angle so as to converge toward each other axially away from the respective cleats. The draft angle of each of the clip-engaging surfaces being between about −2 degrees and about −10 degrees. In some examples, the draft angle of each of the clip-engaging surfaces is about −5 degrees. As such, the angled clip-engaging surfaces are configured to cooperate to retain the first and second ends of the spring clip when the spring clip is compressed.

In some example aspects, the first grip tab 114 and the second grip tab 116 each define a radially extending notch 142. The notch on each of the first and second grip tabs is sized and shaped to receive an outer profile of a torsion member 118 operably engaged between the inner and outer sleeves 102, 108. In some examples, the torsion member comprises a torsion spring coiled around the inner and outer sleeves. In some aspects, a depression 146 is formed on interior surfaces of each of the first and second grip tabs, as well. The depression is formed to receive opposing ends of the torsion member. For example, in some instances, a first end of the torsion member is received within the depression formed on the first grip tab while a second end of the torsion member is received within the depression formed on the second grip tab. In this manner, the torsion member is configured to normally bias the first and second grip tabs 114, 116 in a rotational direction away from each other, such that the first cleat 106 and the second cleat 112 are normally spaced-apart from each other.

In some still further example aspects, the outer sleeve further comprises a stop element 124 configured to interact with the inner sleeve 102 so as to limit rotation of the first and second grip tabs 114, 116 away from each other. More specifically, in some example aspects, the stop element is configured to engage the first cleat 106 of the inner sleeve 102 so as to limit an extent that the first cleat and second cleat 112 of the outer sleeve 108 rotate away from each other. In this manner, the opposing lugs 120, 122 of the first and second cleats when farthest apart from each other are configured to fit between respective side walls 208, 210 of the nut plate 216, and engage the outer surfaces of the first and second ends 204, 206 of the spring clip. The stop element is formed at the end 110 of the outer sleeve about the end of the longitudinally extending opening 144.

In some aspects, the tool 100 further comprises a mechanism to receive the spring clip 202 after the spring clip has been retained thereby. In this manner, for example, and as illustrated in at least FIGS. 3A and 3C, the tool further comprises or defines a channel 130 disposed at the end 110 of the outer sleeve 108, with the channel 130 extending circumferentially thereabout so as to provide clearance for the spring clip when the first end 204 and the second end 206 of the spring clip are compressed by the opposing lugs 120, 122. For example, where the spring clip comprises a spring clip 202 as illustrated in FIG. 2A, the channel is sized and/or shaped to provide clearance for the spring clip where the spring clip is compressed when the first end and the second end of the spring clip are compressed. The first and second ends of the spring clip are engaged with and retained by the respective cleats 106, 112 of the inner and outer sleeves.

In some example aspects, the tool 100 further comprises a threaded bolt 132 to move into contact with and retain the internally threaded nut 214 within the tool after the spring clip 202 is compressed. For example, the threaded bolt is configured to be received in and engaged with an internally threaded hole 134 extending along the longitudinally extending central axis of the inner sleeve 102. The threaded bolt is disposed within the internally threaded hole in the inner sleeve, and also extends within the internally threaded hole in the internally threaded nut, but is not in contact with the internally threaded nut retained by the spring clip 202 within the nut plate assembly 200. More specifically, compression of the spring clip is configured to cause the internally threaded nut to move off-center and come into contact with the threaded bolt, such that the internally threaded nut is held against the threaded bolt. The compression of the spring clip also causes the internally threaded nut 214 to move off-center to an extent that the outer diameter of the threaded nut comes into contact with an inner wall of the inner sleeve 102, such that the internally threaded nut is held within the tool by contact with the threaded bolt 132 and by contact with the inner side wall of the inner sleeve. The outer diameter of the threaded nut that comes into contact with the inner wall of the inner sleeve is part of what holds the internally threaded nut in place relative to the tool while the first and second grip tabs 114, 116 are squeezed closed towards each other. In this manner, the internally threaded nut is secured with respect to the inner side wall if the inner sleeve and the threaded bolt in the inner sleeve such that the spring clip and the internally threaded nut are retained by the tool and removed together from the nut plate assembly.

As such, it is advantageous, in some example aspects, to position the tool 100 over the nut plate assembly 200 with the threaded bolt 132 (that is disposed within the inner sleeve 102) extending into but not contacting the internally threaded nut 214, prior to compressing the first and second grip tabs 114, 116 to engage the spring clip 202.

FIGS. 4A-6B illustrate a three-step process for using an example tool, such as the tool 100 illustrated in FIGS. 1 and 3 to remove a spring clip and internally threaded nut from a nut plate of a nut plate assembly 200, such as that illustrated in FIG. 2A. However, the tool illustrated in FIGS. 4A-6B is only one example of a tool as disclosed herein and other tools having similar mechanisms and functionality is also contemplated by this disclosure. The numbering from FIGS. 1-3 is used throughout the description of FIGS. 4A-6B for convenience, only.

Figure 4A:
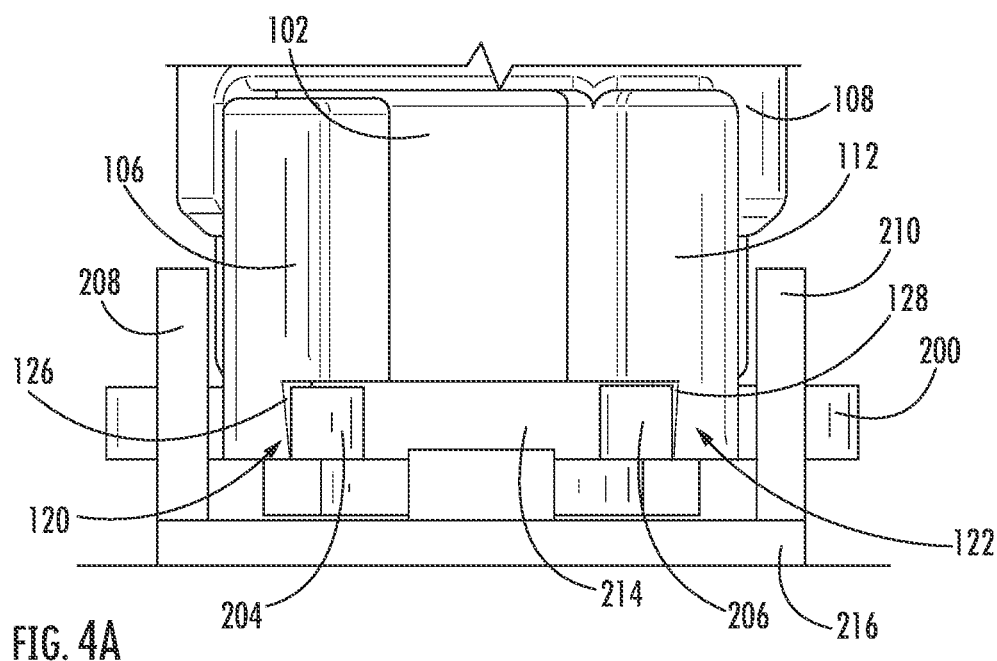
FIG. 4A illustrates a tool engaged with a spring clip and an internally threaded nut of a nut plate assembly according to example aspects of the present disclosure.

In FIG. 4A, the tool 100 is engaged with the spring clip 202 disposed on an internally threaded nut 214 of the nut plate assembly 200 according to example aspects of the present disclosure. Notably, in FIG. 4A, an inner sleeve 102 has an end 104 with a first cleat 106 configured to engage an outer surface of a first end 204 of the spring clip. An outer sleeve 108 has an end with a second cleat 112 configured to engage an outer surface of a second end 206 of the spring clip. The outer sleeve is rotatably disposed about a portion of the inner sleeve. The tool further includes a first grip tab 114 and a second grip tab 116 (not shown) respectively extending radially from a longitudinally extending central axis of the inner sleeve and the outer sleeve. As shown by the gap above and in FIG. 4A, the end surface of cleats and sleeves do not act as a stop or contact the spring clip. A torsion member (not shown) is operably engaged between the inner and outer sleeves and is configured to normally bias the first cleat and the second cleat apart from each other. A stop element (not shown) is configured to interact with the inner sleeve so as to limit the rotation of the first and second grip tabs away from each other due to the torsion member. Thus, in FIG. 4A, the first and second cleats are normally biased apart from each other, as the first and second grip tabs are kept normally biased apart by the torsion member, and the first cleat and the second cleat are engaged with the outer surfaces of the first and second ends of the spring clip to enable the spring clip to be compressed and removed from the assembled nut plate.

Figure 4B:
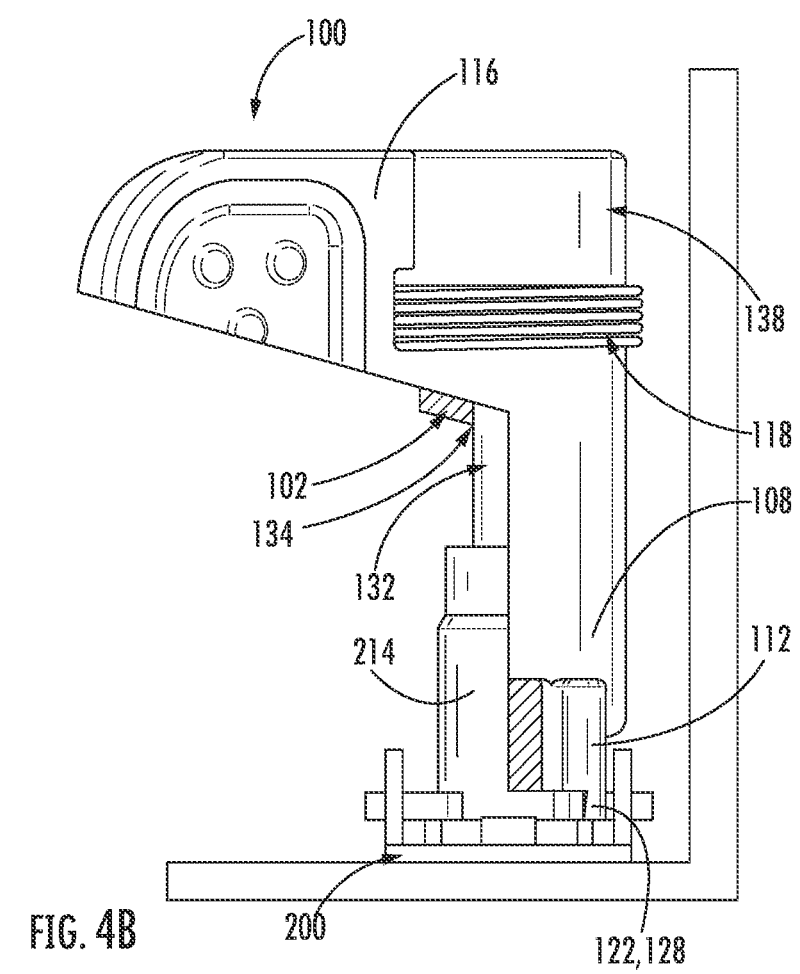
FIG. 4B illustrates a cross-section view of a tool engaged with a spring clip and an internally threaded nut of a nut plate assembly according to example aspects of the present disclosure.

FIG. 4B illustrates a cross-section of a tool 100 positioned on a nut plate assembly 200 where the second cleat 112 on the outer sleeve 108 is engaged with the second end 206 of the spring clip 202. The grip tabs 114, 116 have not been moved towards each other and the opposing lugs 120, 122 on the cleats have not compressed the ends of the spring clip. In FIG. 4B, a threaded bolt 132 is threadably received in an internally threaded hole 134 extending along the longitudinally extending central axis of the inner sleeve 102. As shown in FIG. 4B, the threaded bolt is disposed within the internally threaded hole in the inner sleeve and is also positioned within the central hole in the internally threaded nut, but not engaged with the threads of the internally threaded nut 214. Thus, the threaded bolt is disposed with respect to the internally threaded hole of the internally threaded nut for enabling contact with the internally threaded nut of the nut plate assembly upon compression of the grip tabs. More specifically, the threaded bolt is disposed within the centrally defined opening of the internally threaded nut, such that upon compression of the grip tabs the resulting compression of the spring clip may cause the internally threaded nut to move off-center so that the outer diameter of the internally threaded nut 214 comes into contact with an inner wall of the inner sleeve 102, and causes the internally threaded nut to move off-center and into contact with the threaded bolt, i.e., the threaded bolt is in disposition within the internally threaded nut (as in FIG. 5D).

Figure 4C:
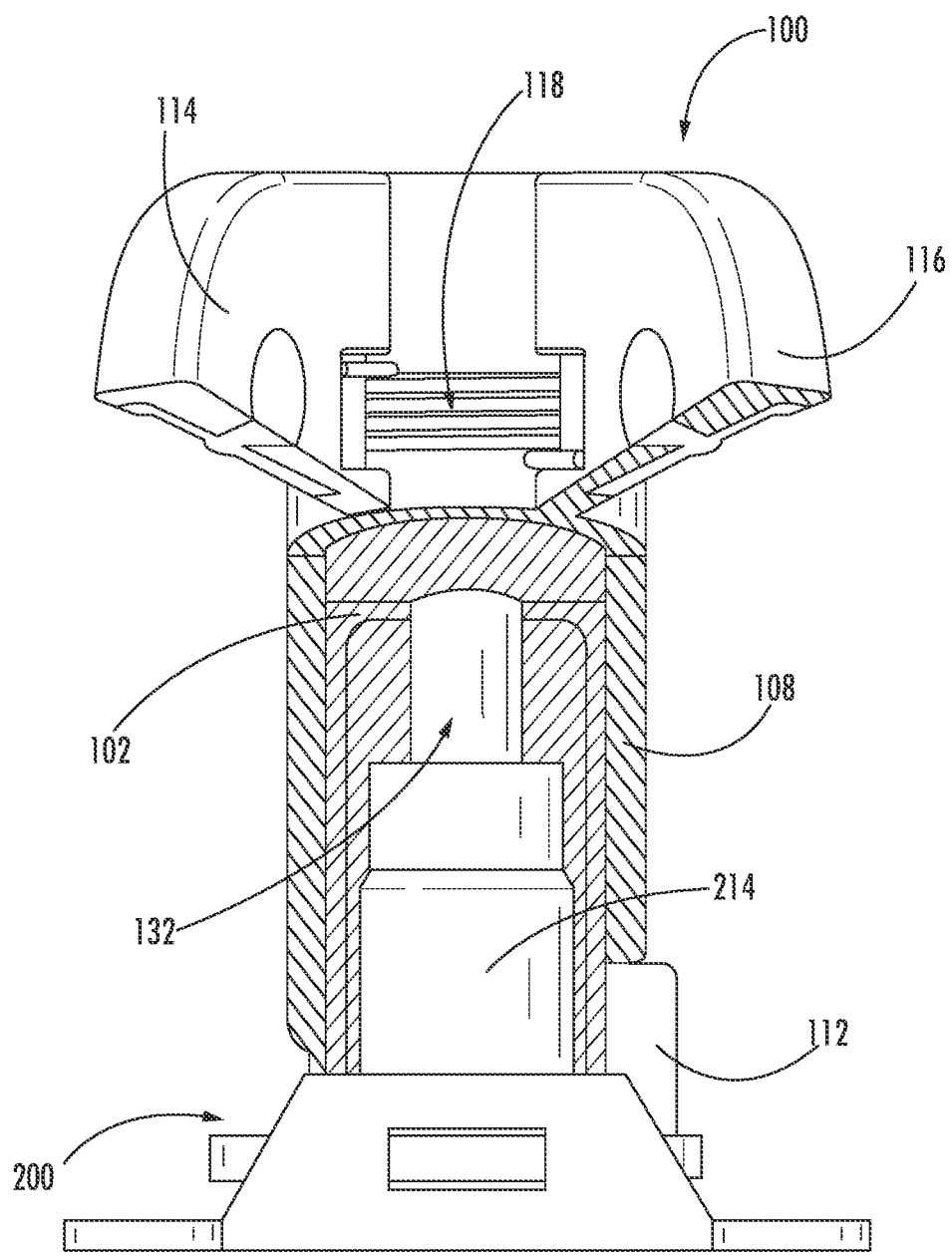
FIG. 4C illustrates a cutaway view of FIG. 4B.

FIG. 4C illustrates a cutaway of the tool 100 shown in FIG. 4B when viewed from a side of the tool, where the opposing lugs 120, 122 on the cleats 106, 112 have not compressed the ends of the spring clip 202 and the internally threaded nut 214 is centered within center hole in the inner sleeve 108. Notably, the square-shaped spring clip 202 is shown with portions extending outside of the two side walls 208, 210 (through slots in the two side walls).

Figure 4D:
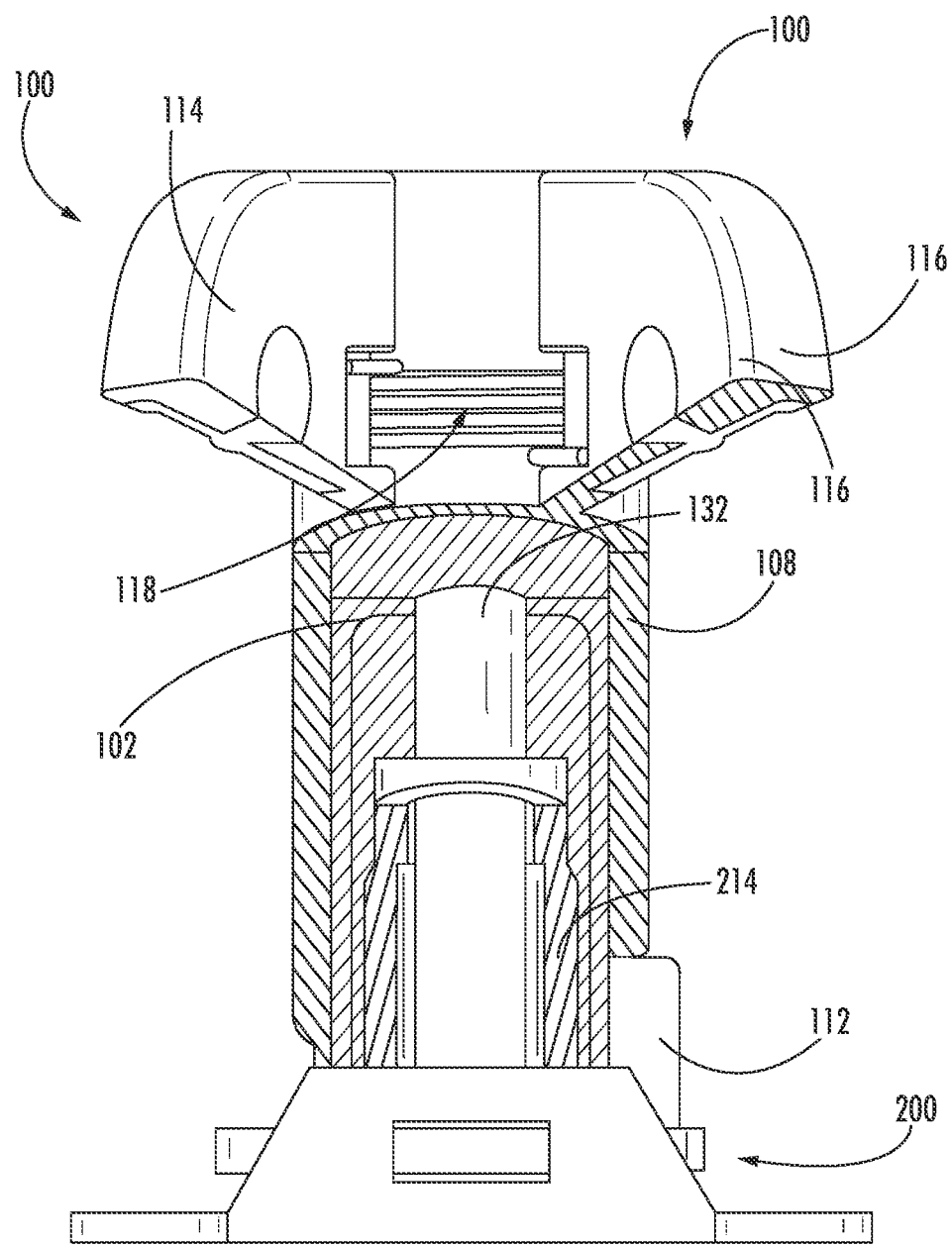
FIG. 4D illustrates a cutaway view of FIG. 4C.

FIG. 4D illustrates a further cutaway of the tool 100 shown in FIG. 4C when viewed from a side of the tool 100. In some examples, the sleeve may be configured to contact the threaded interior of the internally threaded nut 214 when the grips 114, 116 are moved into contact and the ends 204, 206 of the spring 202 are thereby compressed. In this manner, the sleeve may be configured to contact the threads of the internally threaded nut when the internally threaded nut is moved off-center, substantially simultaneously with the outer diameter of the internally threaded nut moving off-center into contact with an inner side wall of the inner sleeve. The sleeve may comprise a coating, a tubing, or the like that extends along an axial length of the threaded bolt. For example, a length of heat shrink tubing may extend along the axial length of the threaded bolt after assembly of the tool. In another example, a urethane coating may extend along the threaded bolt. Other materials, manufacturing processes of the sleeve, or the like are also contemplated by this disclosure, however.

Figure 5A:
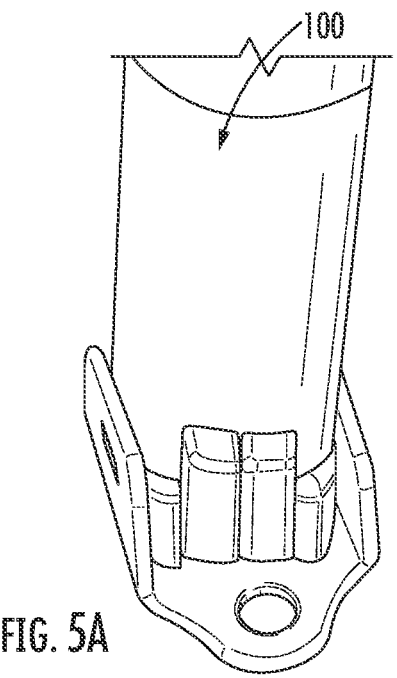
FIG. 5A illustrates the tool of FIG. 4A compressing the spring clip of the nut plate assembly.

In FIG. 5A, the tool 100 is engaged with and compressing the spring clip 202, and also in contact with the internally threaded nut 214 of the nut plate assembly 200 according to example aspects of the present disclosure. In FIG. 5A, the first and second grip tabs 114, 116 (not shown) are moved towards each other to rotate the inner sleeve 102 relative to the outer sleeve 108, and cause the first cleat 106 and the second cleat 112 to rotate towards each other to engage the outer surfaces of the first and second ends 204, 206 of the spring clip. To move the first and second grip tabs towards each other, the first and second grip tabs are compressed (e.g., grasped and moved toward each other at the gripping surfaces 136 by a user), the force of the compression overcoming the torsion force of the torsion member (not shown) operably engaged between the inner and outer sleeves 102, 108, and normally biasing the grip tabs away from each other. Force of the compression of the first and second grip tabs results in the clip-engaging surfaces 126, 128 of the opposing lugs 120, 122 engaging and compressing the outer surfaces of the first and second ends of the spring clip so as to remove the body 212 of the spring clip from openings in the respective side walls 208, 210 of the nut plate 216.

Figure 5B:
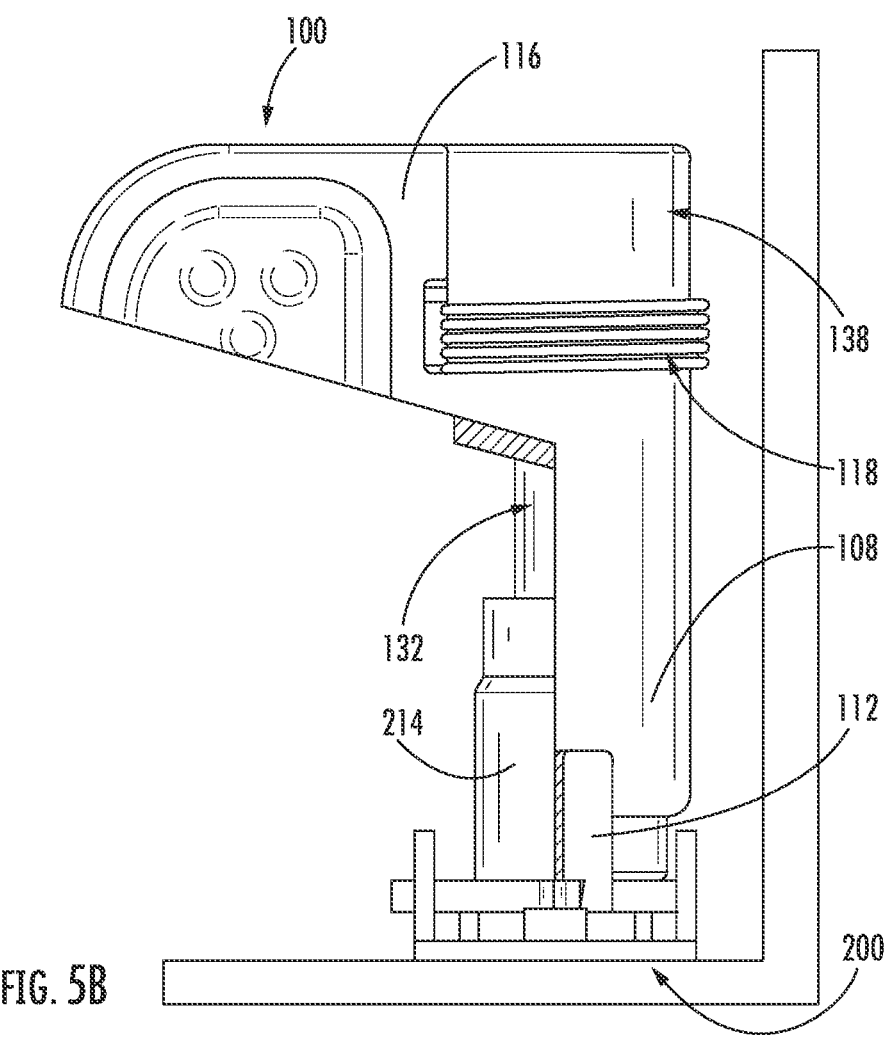
FIG. 5B illustrates a cross-section view of a tool engaged with a spring clip and an internally threaded nut of a nut plate assembly compressing the spring clip of the nut plate assembly.

FIG. 5B illustrates a cross-section of the view of the tool 100 upon moving the first and second grip tabs 114, 116 towards each other to cause the clip-engaging surfaces 126, 128 of the opposing lugs 120, 122 to squeeze the first and second ends 204, 206 of the spring clip 202 towards each other. In some examples, compression of the first and second ends of the spring clip causes compression of the square-shaped spring clip so that portions of the spring clip do not extend outside of the two side walls 208, 210 (as in FIG. 4B), such that the spring clip is positionable in the space between the side walls and moved upwards. In FIG. 5B, the threaded bolt 132 is received in and engaged with the internally threaded hole 134 extending along the longitudinally extending central axis of the inner sleeve 102, and is also positioned within the internally threaded nut 214.

Figure 5C:
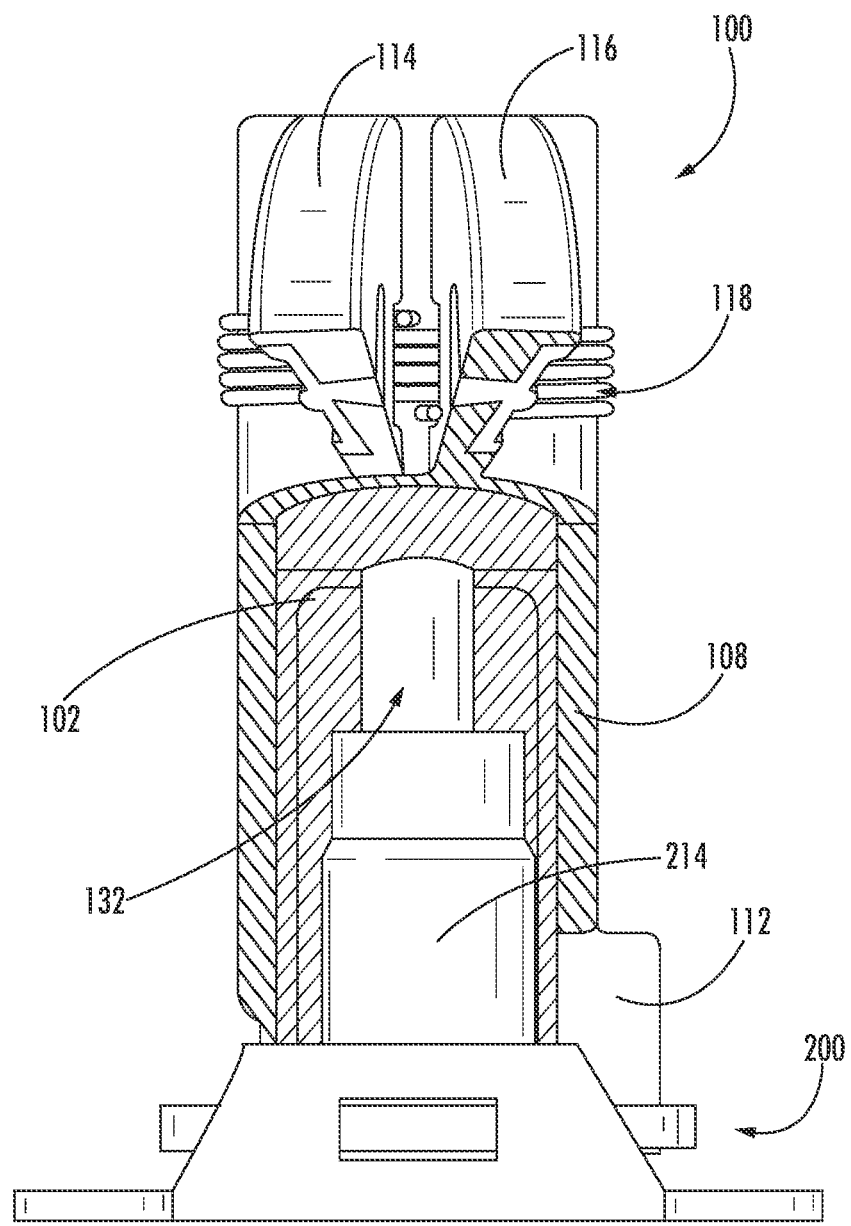
FIG. 5C illustrates a cutaway view of FIG. 5B.
Figure 5D:
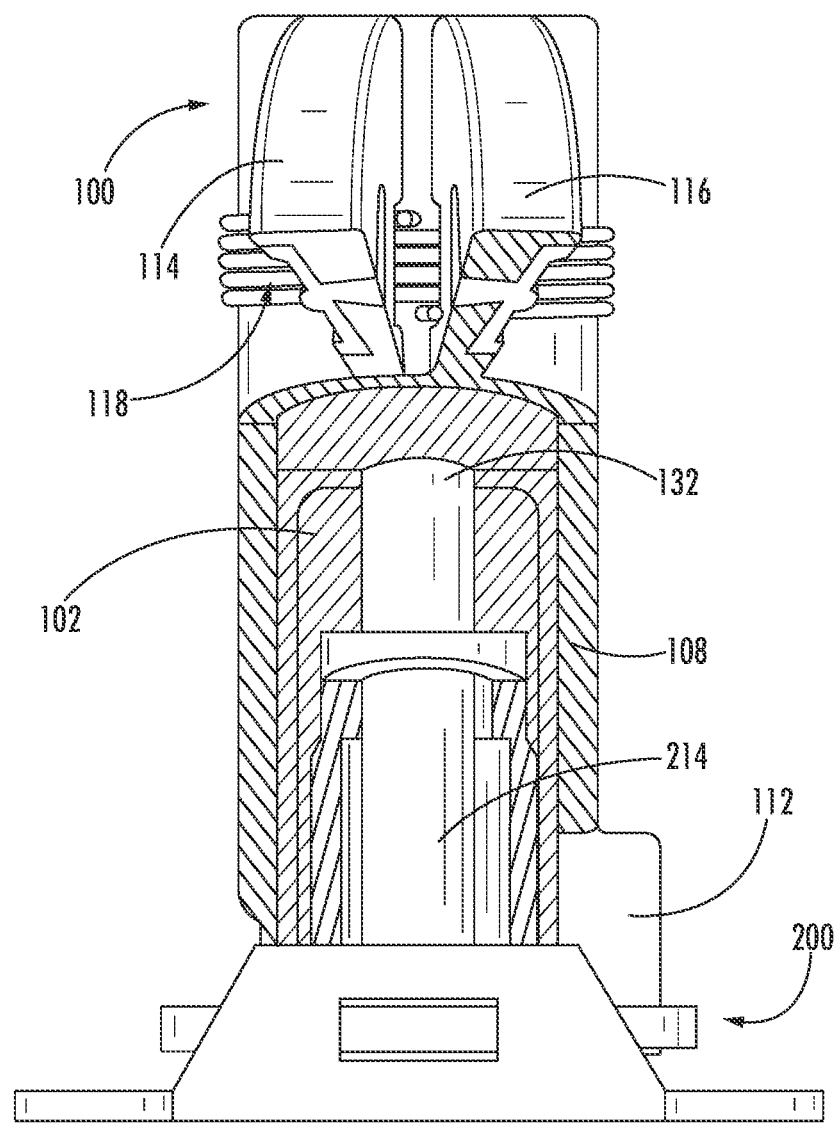
FIG. 5D illustrates a cutaway view of FIG. 5C.

FIG. 5C illustrates a cut-away of the tool shown in FIG. 5B when viewed from the side of the tool having the grip tabs. As shown, compression of the spring clip 202 results in the threaded bolt disposed within the centrally defined opening of the internally threaded nut 214 coming into contact with the internally threaded nut. Specifically, compressing the ends of the spring clip surrounding the internally threaded nut causes the internally threaded nut to be moved off-center and the outer diameter of the internally threaded nut to contact an inner side wall of the inner sleeve 106 as shown in FIG. 5D. The internally threaded nut that is moved off-center also moves into contact with the threaded bolt, i.e., the internal threads of the nut move into a disposition and engagement within the threaded bolt. Accordingly, with the grip tabs squeezed to compress the spring clip, the internally threaded nut that is moved into contact with the threaded bolt (and into contact with the inner side wall of the inner sleeve) is also held and retained within the inner sleeve, such that the tool may remove both the spring clip and the internally threaded nut (when the tool is rotated slightly to provide further clearance of the spring clip relative to the side walls). FIG. 5D illustrates a further cutaway of the tool 100 shown in FIG. 5C when viewed from a side of the tool 100.

In FIG. 6A, the tool 100 remains engaged with and compressing the spring clip 202 and also in contact with the internally threaded nut 214 of the nut plate assembly 200 according to example aspects of the present disclosure. However, in FIG. 6A, the spring clip and the internally threaded nut have been removed from the nut plate 216. Thus, FIG. 6A illustrates, the tool securely retaining the spring clip via the opposing lugs 120, 122 on the first cleat 106 and the second cleat 112, relative to the end of the inner sleeve 102 (or the outer sleeve) and the internally threaded nut at the ends 104, 110 of the inner sleeve and the outer sleeve, respectively. Notably, in FIG. 6A, the first and second grip tabs 114, 116 remain urged or compressed towards each other, which maintains rotation of the inner sleeve 102 relative to the outer sleeve 108, against the normal bias of the torsion member, and causes the first cleat 106 and the second cleat 112 to maintain in a position rotated towards each other to engage the outer surfaces of the first and second ends 204, 206 of the spring clip. Release of the grip tabs results in release of the cleats from compressing the spring clip so that spring clip can be removed from the end of the tool.

Figure 6B:
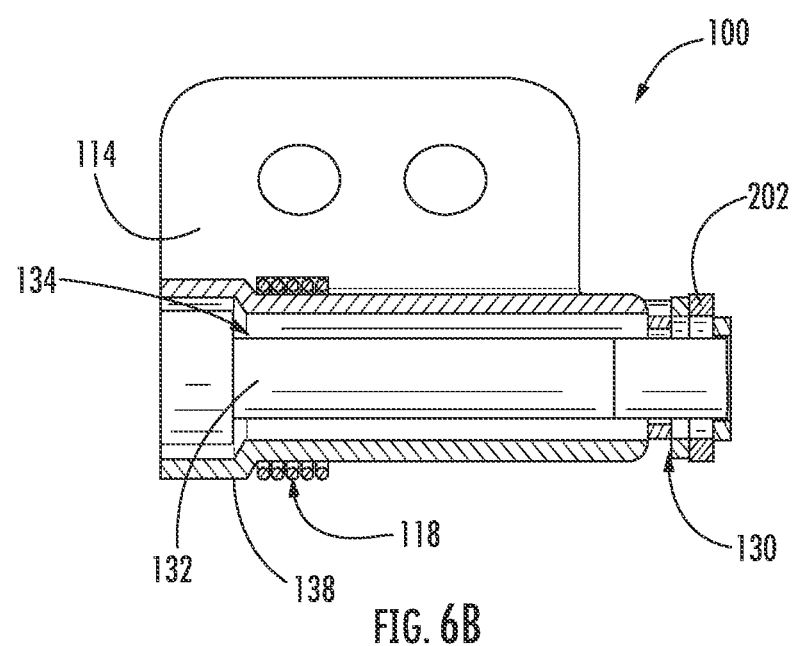
FIG. 6B illustrates a cross-section view of FIG. 6A.

FIG. 6B illustrates a cross-section of the view of FIG. 6A. In FIG. 6B, the threaded bolt 132 is received in and engaged with the internally threaded hole 134 extending along the longitudinally extending central axis of the inner sleeve 102. In FIG. 6B, the threaded bolt is in contact with the internally threaded nut 214 of the nut plate assembly 200. To release the internally threaded nut, the threaded bolt is rotated in the opposite direction to which it was initially rotated to engage the internally threaded nut. The threaded bolt is then movable out of engagement with the centrally defined opening of the internally threaded nut.

Figure 7A:
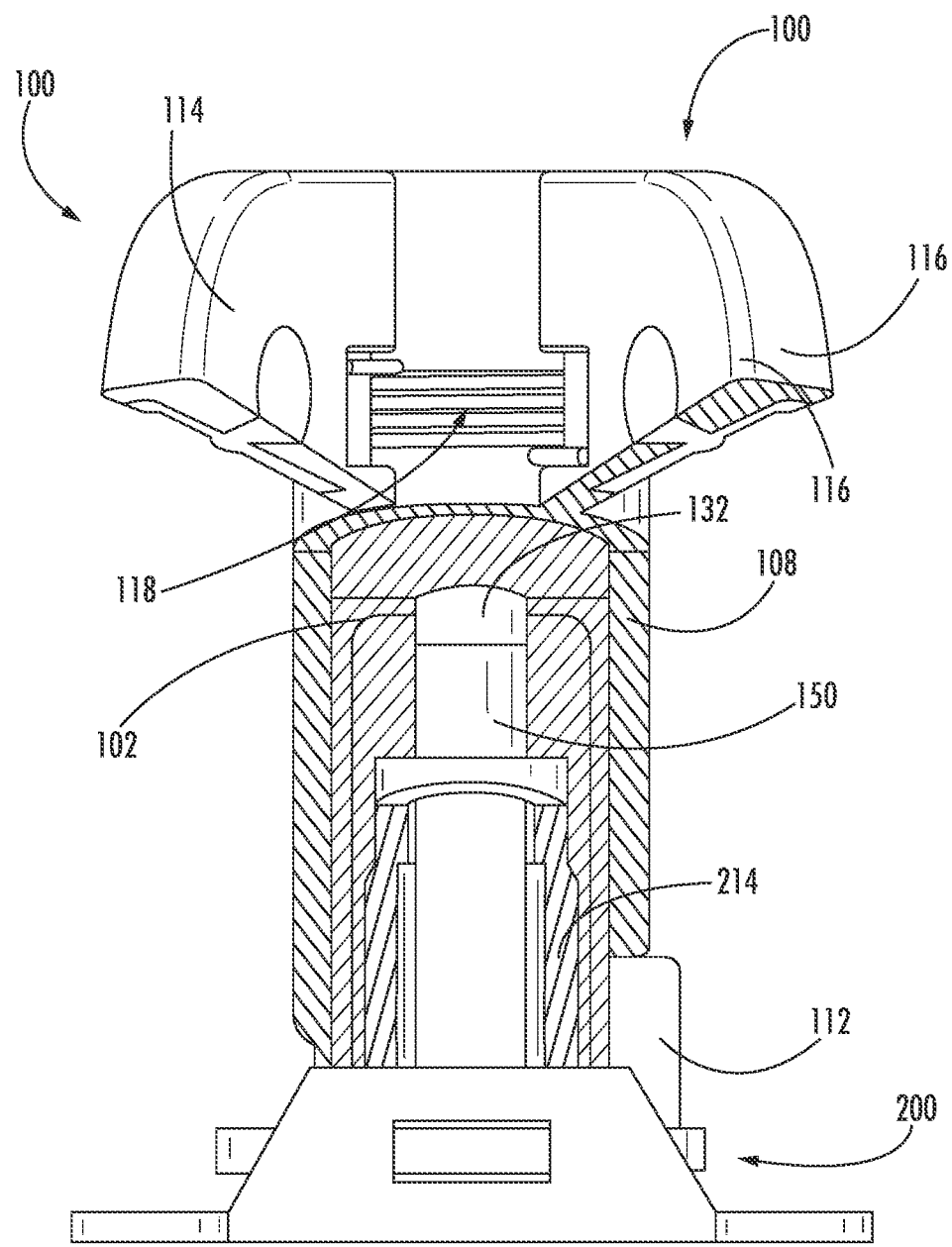
FIG. 7A illustrates a cutaway view of an alternate embodiment of the tool in FIG. 4D, which includes a sleeve extending along an axial length of the threaded bolt.
Figure 7B:
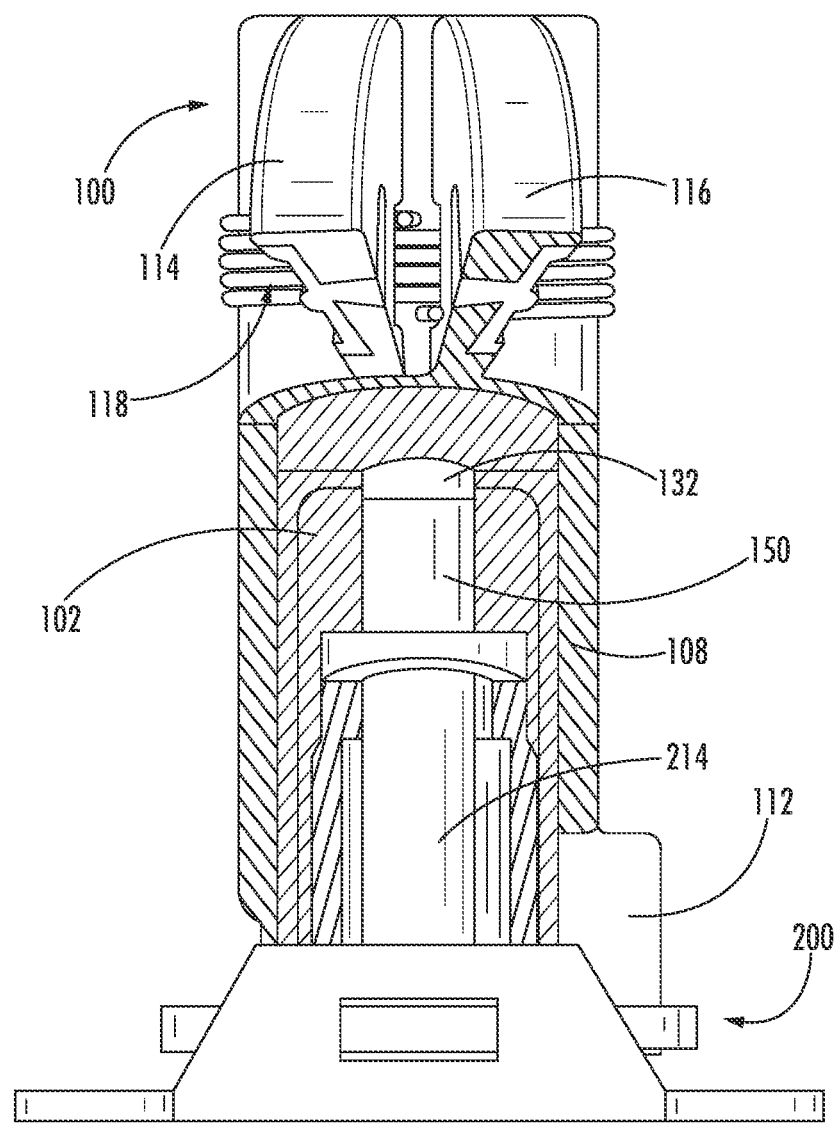
FIG. 7B illustrates a cutaway view of an alternate embodiment of the tool in FIG. 5D, which includes a sleeve extending along an axial length of the threaded bolt.

In a further embodiment, as shown in FIG. 7A the threaded bolt 132 comprises a sleeve 150 that extends along an axial length of the threaded bolt, where the sleeve 150 on the threaded bolt 132 is configured to contact the threads of the internally threaded nut when the internally threaded nut is moved off-center upon compression of the grip tabs as shown in FIG. 7B.

Accordingly, the tool 100 illustrated in FIGS. 1 and 3-7B overcomes deficiencies associated with removal of spring clips and/or the retained nuts from nut plate assemblies, such as those illustrated in FIGS. 2A and 2B. Specifically, the tool 100 is capable of easily removing and reinstalling a spring clip and/or an internally threaded nut on a nut plate, without having to use needle nose pliers or conventionally-used tools, which are hard to maneuver in confined spaces and often result in creating foreign object debris (FOD).

Figure 8:
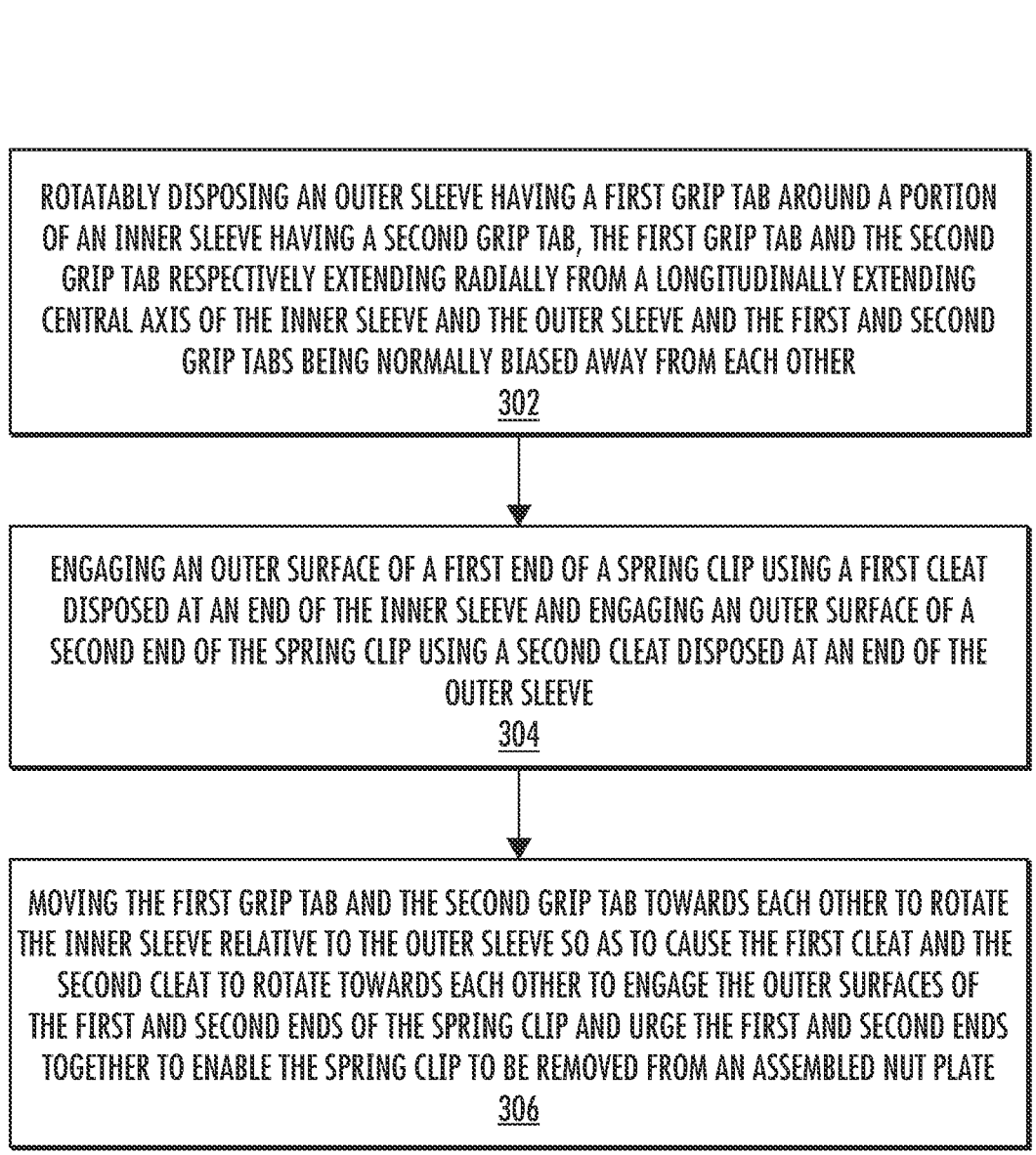
FIG. 8 is a flowchart illustrating various steps in a method according to example aspects of the present disclosure.

Additionally, aspects of the present disclosure further provides a method for removal of a spring clip from a nut plate assembly, as previously described herein. In particular, FIG. 8 illustrates a schematic block diagram of a method 300 for removal of a spring clip from a nut plate assembly using a tool as described herein.

In particular, the method 300 comprises a first step, 302, of rotatably disposing an outer sleeve having a first grip tab around a portion of an inner sleeve having a second grip tab, the first grip tab and the second grip tab respectively extending radially from a longitudinally extending central axis of the inner sleeve and the outer sleeve and the first and second grip tabs being normally biased away from each other.

The method 300 further comprises a second step, 304, of engaging an outer surface of a first end of a spring clip using a first cleat disposed at an end of the inner sleeve and engaging an outer surface of a second end of the spring clip using a second cleat disposed at an end of the outer sleeve.

The method 300 further comprises a third step, 306, of moving the first grip tab and the second grip tab towards each to rotate the inner sleeve relative to the outer sleeve so as to cause the first cleat and the second cleat to rotate towards each other to engage the outer surfaces of the first and second ends of the spring clip and urge the first and second ends together to enable the spring clip to be removed from an assembled nut plate.

In some example aspects, rotatably disposing an outer sleeve around the portion of the inner sleeve further comprises operably engaging a torsion member between the inner and outer sleeves so as to normally bias the first cleat and the second cleat apart from each other.

In some example aspects, engaging the outer surfaces of the first and second ends of the spring clip further comprises compressing the spring clip when the first and second cleats are rotated toward each other using opposing lugs extending axially from the first and second cleats on the inner sleeve and the outer sleeve, respectively.

In some example aspects, rotatably disposing the outer sleeve around the portion of the inner sleeve further comprises interacting a stop element of the outer sleeve with the inner sleeve so as to limit an extent that the first cleat and second cleat rotate away from each other, such that the opposing lugs of the first and second cleats when farthest apart from each other fit between respective side walls of the nut plate assembly and engage the outer surfaces of the first and second ends of the spring clip.

In some example aspects, engaging the outer surfaces of the first and second ends of the spring clip using the opposing lugs further comprises cooperatively retaining the first and second ends of the compressed spring clip with clip-engaging surfaces angled toward each other at a draft angle, the clip-engaging surfaces being disposed on the opposing lugs and converging toward each other axially away from the respective cleats, the draft angle of each of the clip-engaging surfaces being between about −2 degrees and about −10 degrees.

In some example aspects, engaging the outer surfaces of the first and second ends of the spring clip using the opposing lugs further comprises engaging the outer surfaces of the first and second ends of the spring clip using the opposing lugs each extending at least a predetermined length from the first and second cleats, the predetermined length being at least a thickness of the spring clip.

In some example aspects, moving the first grip tab and the second grip tab towards each to rotate the inner sleeve relative to the outer sleeve further comprises compressing the spring clip circumferentially with clearance provided by a channel disposed at the end of the inner sleeve, when the first end and the second end of the spring clip are compressed by the opposing lugs.

In some example aspects, the method 300 further comprises engaging a threaded bolt with an internally threaded hole extending along the longitudinally extending central axis of the inner sleeve with respect to the internally threaded hole, the threaded bolt being disposed within but not in contact with an internally threaded nut retained by the spring clip within the nut plate assembly, such that compressing the spring clip causes the internally threaded nut to move off-center and into contact with an inner side wall of the inner sleeve and also the threaded bolt so as to hold the internally threaded nut with respect to the threaded bolt and inner side wall of the inner sleeve such that the spring clip and the internally threaded nut are retained and removed together from the nut plate assembly.

Many modifications and other aspects of the disclosure set forth herein will come to mind to one skilled in the art to which the disclosure pertains having the benefit of the teachings presented in the foregoing description and the associated drawings. Therefore, it is to be understood that the disclosure is not to be limited to the specific aspects disclosed and that modifications and other aspects are intended to be included within the scope of the appended claims. Moreover, although the foregoing description and the associated drawings describe example aspects in the context of certain example combinations of elements and/or functions, it should be appreciated that different combinations of elements and/or functions provided by alternative aspects without departing from the scope of the appended claims. In this regard, for example, different combinations of elements and/or functions than those explicitly described above are also contemplated as is set forth in some of the appended claims. Although specific terms are employed herein, they are used in a generic and descriptive sense only and not for purposes of limitation.

What is claimed is:

1. A method for removal of a spring clip from a nut plate assembly, comprising:

rotatably disposing an outer sleeve having a second grip tab around a portion of an inner sleeve having a first grip tab, the first grip tab and the second grip tab respectively extending radially from a longitudinally extending central axis of the inner sleeve and the outer sleeve and the first and second grip tabs being normally biased away from each other;

engaging an outer surface of a first end of the spring clip using a first cleat disposed at an end of the inner sleeve and engaging an outer surface of a second end of the spring clip using a second cleat disposed at an end of the outer sleeve; and moving the first grip tab and the second grip tab towards each other to rotate the inner sleeve relative to the outer sleeve to cause the first cleat and the second cleat to rotate towards each other to engage the outer surfaces of the first and second ends of the spring clip and urge the first and second ends together to enable the spring clip to be removed from an assembled nut plate.

2. The method of claim 1, wherein the rotatably disposing the outer sleeve around the portion of the inner sleeve further comprises operably engaging a torsion spring between the inner and outer sleeves to normally bias the first cleat and the second cleat apart from each other.

3. The method of claim 1, wherein the engaging the outer surfaces of the first and second ends of the spring clip further comprises compressing the spring clip when the first and second cleats are rotated toward each other using opposing lugs extending axially from the first and second cleats on the inner sleeve and the outer sleeve, respectively.

4. The method of claim 3, wherein the rotatably disposing the outer sleeve around the portion of the inner sleeve further comprises interacting a stop element of the outer sleeve with the inner sleeve to limit an extent that the first cleat and the second cleat rotate away from each other, such that the opposing lugs extending axially from the first and second cleats when farthest apart from each other fit between respective side walls of the nut plate assembly and engage the outer surfaces of the first and second ends of the spring clip.

5. The method of claim 3, wherein the engaging the outer surfaces of the first and second ends of the spring clip using the opposing lugs further comprises retaining the first and second ends of the compressed spring clip with clip-engaging surfaces angled toward each other at a draft angle, the clip-engaging surfaces being disposed on the opposing lugs and converging toward each other axially away from respective cleats of the first and second cleats, the draft angle of each of the clip-engaging surfaces being between −2 degrees and −10 degrees.

6. The method of claim 3, wherein the engaging the outer surfaces of the first and second ends of the spring clip using the opposing lugs further comprises engaging the outer surfaces of the first and second ends of the spring clip using the opposing lugs each extending at least a predetermined length from the first and second cleats, the predetermined length being at least a thickness of the spring clip.

7. The method of claim 3, wherein the moving the first grip tab and the second grip tab towards each other to rotate the inner sleeve relative to the outer sleeve causes compression of the spring clip circumferentially with clearance provided by a channel disposed at the end of the inner sleeve, when the first end and the second end of the spring clip are compressed by the opposing lugs.

8. The method of claim 1, further comprising engaging a threaded bolt with an internally threaded hole extending along the longitudinally extending central axis of the inner sleeve with respect to the internally threaded hole, the threaded bolt being disposed within an internally threaded nut retained by the spring clip within the nut plate assembly, such that compressing the spring clip causes the internally threaded nut to move off-center and into contact with the threaded bolt to secure the internally threaded nut with respect to the threaded bolt in the inner sleeve such that the spring clip and the internally threaded nut are retained and removed together from the nut plate assembly.

* * * * *